(12) United States Patent
Sayan et al.

(10) Patent No.: US 6,477,569 B1
(45) Date of Patent: *Nov. 5, 2002

(54) METHOD AND APPARATUS FOR COMPUTER NETWORK MANAGEMENT

(76) Inventors: Eugene Sayan, 127 Singingwood Dr., Holbrook, NY (US) 11741; Stephane Stolz, 12 Wendover Rd., East Setauket, NY (US) 11733

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/197,955

(22) Filed: Nov. 20, 1998

(51) Int. Cl.[7] .............................................. G06F 13/00
(52) U.S. Cl. ...................... 709/223; 709/102; 709/222; 709/227
(58) Field of Search ................................ 709/102, 104, 709/202, 203, 217, 219, 223, 224, 225, 226, 227, 313, 328, 329

(56) References Cited

U.S. PATENT DOCUMENTS

| 5,079,740 A | 1/1992 | Patel et al. ................. 364/900 |
| 5,287,461 A | 2/1994 | Moore ......................... 395/275 |
| 5,307,469 A | 4/1994 | Ichinose et al. ............. 395/650 |
| 5,341,477 A | 8/1994 | Pitkin et al. ................. 395/230 |
| 5,390,170 A | 2/1995 | Sawant et al. .............. 370/58.1 |
| 5,475,817 A | 12/1995 | Waldo et al. ................ 395/650 |
| 5,519,707 A | 5/1996 | Subramanian et al. ..... 370/94.2 |
| 5,553,239 A | 9/1996 | Health et al. ........... 395/187.01 |
| 5,553,242 A | 9/1996 | Russell et al. .......... 395/200.12 |
| 5,560,005 A | 9/1996 | Hoover et al. ............... 395/600 |
| 5,563,878 A | 10/1996 | Blakeley et al. ............... 370/60 |
| 5,588,060 A | 12/1996 | Aziz ............................ 380/30 |
| 5,594,921 A | 1/1997 | Pettus ......................... 395/831 |
| 5,694,547 A | 12/1997 | Subramanian et al. . 395/200.11 |
| 5,724,575 A | 3/1998 | Hoover et al. ............... 395/610 |
| 5,729,685 A | 3/1998 | Chatwani et al. ....... 395/200.11 |
| 5,748,896 A | 5/1998 | Daly et al. ............. 395/200.53 |
| 5,794,039 A | 8/1998 | Guck ........................... 395/683 |
| 5,809,235 A | * 9/1998 | Sharma et al. ............... 709/230 |
| 6,105,067 A | * 8/2000 | Batra ........................... 709/227 |

* cited by examiner

*Primary Examiner*—Viet D. Vu
(74) *Attorney, Agent, or Firm*—Scully, Scott, Murphy & Presser

(57) ABSTRACT

A method and apparatus for managing a computer network which utilizes a process pool. A pool master dispatches agents for transaction processing. The agents are application specific and utilize a common interface. The process pool grows as transactions increase and contracts as transactions decrease.

11 Claims, 15 Drawing Sheets

```
; Process Pool Configuration File
;
;--------------------------------------------------
;
; CONFIGURATION PARAMETERS
;
;
;
;
;--------------------------------------------------
 [Master]
Kill Timeout   : 10
Minimum Agent  : 1
RPC Number     : 3000020
RPC Version    : 1
RPC Server     : pool
RPC Protocol   : udp
Log File       : d.log
Log Size       : 10
Log Level      : Info, Warning
Log Host       : durance
CPU Limit      : 2
CPU Priority   : 10
Alarm          :  60

[Agent]
Max Idle time  : 10
Log File       : d_agent.log
Log Level      : Info, Warning
Log Size       : 10
Log Host       : durance
CPU Limit      : 3
CPU Priority   : 11
Alarm          :  60

[Environment]
DEFAULTCAB     : Slip
DSQUERY        : Slip
```

Figure 3

Process/Communication Architecture

METHOD AND APPARATUS FOR COMPUTER NETWORK MANAGEMENT

BACKGROUND OF THE INVENTION

1. Field of the Invention

The present invention relates to methods and apparatus for managing computers, data, information and peripheral resources particularly in a computer network. More specifically, the invention relates to improved methods and apparatus for computer network management. The improved methods and apparatus of the present invention are highly flexible and easily extensible and optimize the network's resources.

2. Prior Art Background

A computer network as used herein is used in its broadest sense i.e. as any configuration of data processing devices and software connected for information exchange. Generally, a network serves to connect together a plurality of devices; e.g., user interfaces, data devices, processors, memory, and may also include terminals, computers, etc. Networks typically comprise a plurality of CPU's some of which function as servers to provide services to the other computers connected to the network.

There are many types of computer networks in existence. They are known by various names including Local Area Network (LAN), Wide Area Network (WAN), Internet and the like and may be implemented in accordance with a variety of known architectures.

The functions performed by a server in a network vary depending on the network and the server's place within the particular network. For example, at least one server typically functions as a "file server" for the network. (See, generally, Rinzler and Gancher, *The Computer/and Guide To 25 Local Area Networks* Computerland Books, Pleasanton, Calif. pp. 4–34). A computer functioning as a file server will usually have significantly more data storage capacity than the other computers connected to the network. The networked computers utilize this data storage capacity to store data or information usually in the form of files. Software executed by the file server controls access to this data or information.

In addition to a fileserver, a network can include servers such as a print server, a database server, or facsimile server. A print server typically provides access to a centralized printer shared by the network. A network user is able to send a print request to the print server where the request and data to be printed are stored, prioritized with respect to other print requests, and placed on a print queue until the printer is ready to print the job. A database server provides for the centralized storage of a database accessible to the network users. A facsimile server provides users connected to the network access to a facsimile capability located in a centralized facsimile server FIG. 1 (prior art) illustrates an example of a computer network architecture commonly known as a client-server architecture. In the client-server network of FIG. 1, there are a plurality of servers 10 coupled to a network bus 12. A server 10 is typically implemented by a computer or a workstation that is special purposed e.g., large disk space, high speed CPU, multiple LAN connections, etc., while network bus 12 may be implemented by any of the known network routing media such as coaxial cables, multi-strand cables, fiber optic cables, or even a wireless medium such as for example infrared beams. A plurality of client terminals 14, representing known computers or computing terminals, are coupled to the same network bus 12, each of which is capable of communicating with any one of servers 10 or other terminals 14 using one of the known network protocols such as Apple Talk ™, TCP/IP and the like.

On servers 10, there are installed instantiations of network service applications, which are typically software implemented, for performing programmed tasks. Examples of such network service applications include print service, e-mail service, file service, and the like. A print service application manages the printer or print queue associated with a server, thereby enabling client terminals 14 to utilize that printer for their printing needs. An e-mail service application performs e-mail management and routing tasks, permitting client terminals 14 to communicate among one another.

A server 10 may be coupled to one of the network's central file storage facilities, e.g., one of the known persistent memory devices (omitted in FIG. 1 for clarity) such as a hard disk, a RAID (redundant arrays of independent drives) system, an optical storage device, and the like. A file service instantiation installed on that server 10 performs tasks related to file management for the benefit of users on client terminals 14. Such file service tasks include access privilege management, storage space management, and the like. The number and types of network services available to a network are practically limitless.

As mentioned earlier, instantiations of these network services are installed on the network servers. A network service application, e.g., one of the aforementioned print service, file service, or e-mail service applications, may have many instantiations, either on the same server or on different servers. For example, most or all servers 10 in FIG. 1 may each have a print service instantiations installed to manage a network printer. Further, a given service instantiation on a server may service multiple client terminals simultaneously. Likewise, a client terminal may establish a logical session with multiple services simultaneously, either a single server or on multiple servers.

SUMMARY OF THE INVENTION

In a client server environment the client terminals frequently have fewer resources, such as RAM or CPU etc., available at the terminal and rely, in many applications, on the server for all or part of these resources. As a result, the server services multiple transactions from the various clients. In most applications, each client has dedicated resources on the server, even when the client terminal is not being employed. In the present invention, resources are implemented dynamically i.e., occurring at the time it is needed as opposed to occurring at a predetermined or fixed time. For example, when a process is performed on the network of the present invention, the valuable system resources are not dedicated for the entire session. As a result, when a user issues a transaction, the present invention dedicates a process to that transaction. When that transaction is complete, the process becomes available for other transaction processing. Thus, a process is not dedicated to a user but to a transaction. For example, if two users issue a transaction at the same time, a new process is created for the second transaction. Either process will be terminated if the process is not used for a predetermined period of time and processes currently not in use will not consume system resources. The present invention thus results in more efficient use of system resources. Thus, the server or servers in the present invention are used more efficiently, and a pool of 50 users may use only 10 processes. This efficiency of use may also permit the network to require fewer user licenses from software owners since the present invention will regulate the use of a software programs so that there is only a predetermined number of processes using the software program at any given point in time.

The dynamic process behavior of the present invention is provided by a pool master which is the main interface to the client terminals and monitors. The pool master dispatches requests, a pool agent or transaction processor services all transactions and a pool application manager provides dynamic modification of the process pool and monitors the behavior of the pool. The number of pool agents can increase or decrease depending on the flow of requests from the client terminals.

BRIEF DESCRIPTION OF THE DRAWINGS

FIG. 3 is an example of the process pool configuration of the present invention.

DETAILED DESCRIPTION OF THE PREFERRED EMBODIMENTS

Figure 1:
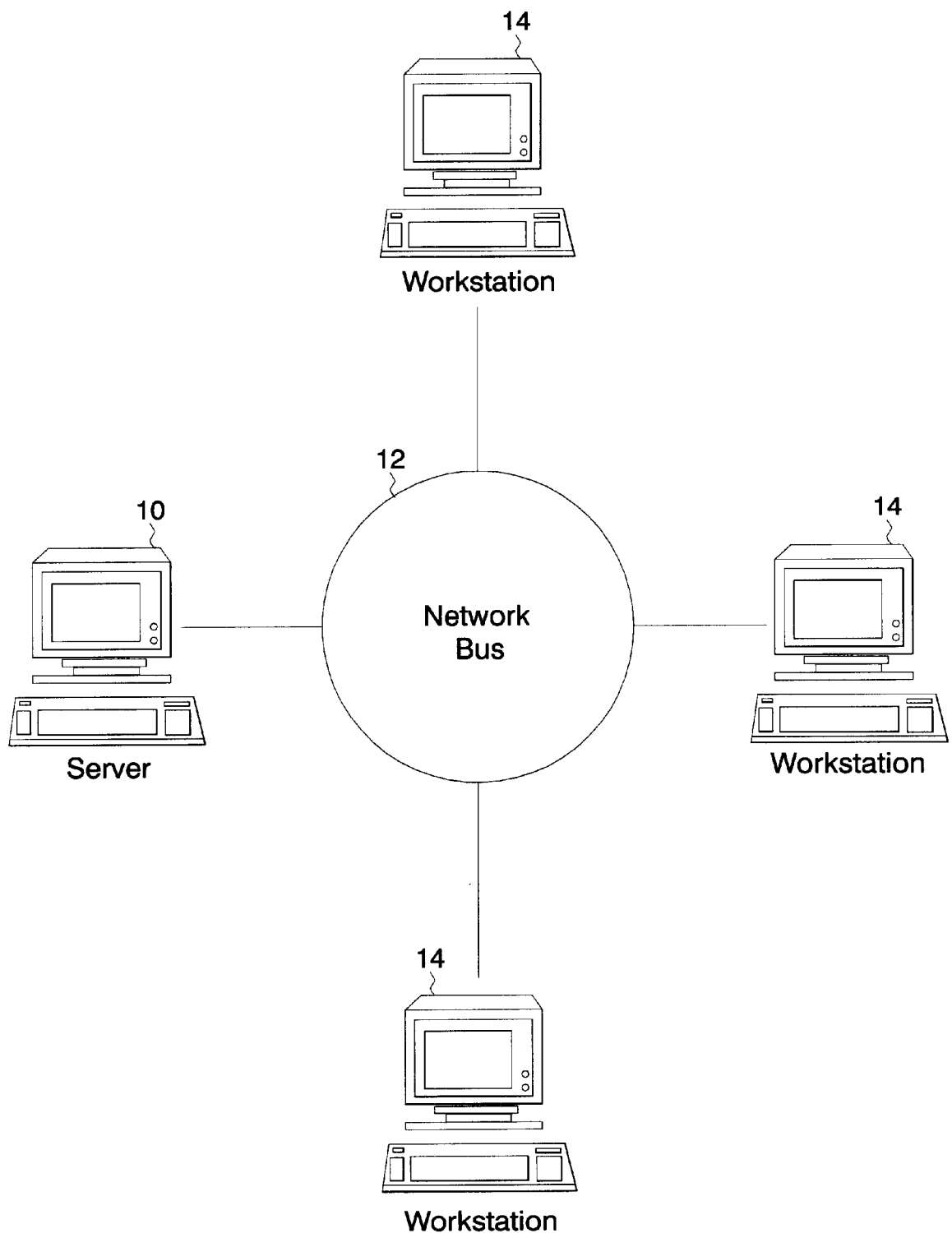
FIG. 1 is, as described in detail above, a diagrammatic representation showing a typical network.
Figure 1A:
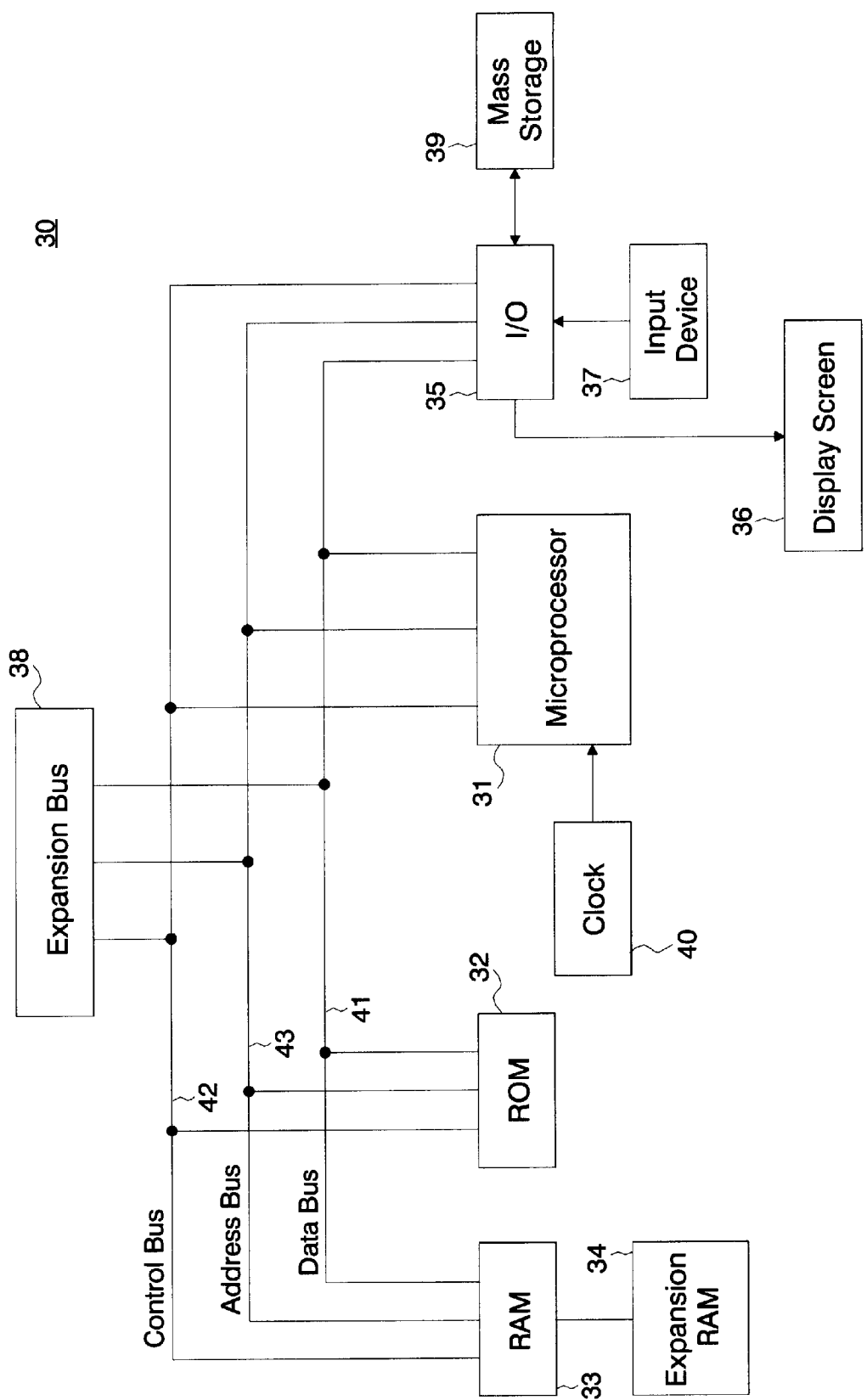
FIG. 1A is a schematic of a typical computer system useful in the operation of the present invention.
Figure 2:
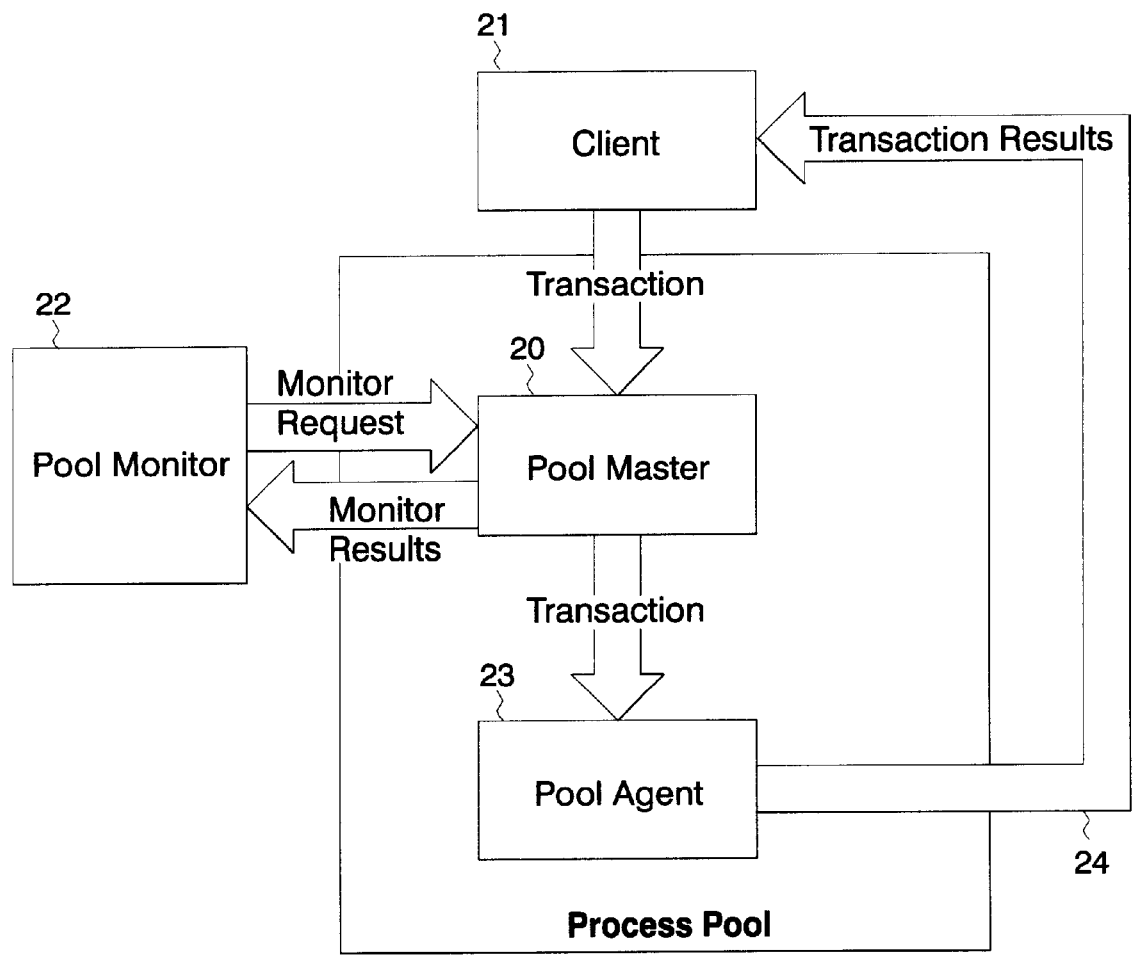
FIG. 2 is a schematic diagram of the network of the present invention.

Typically, servers in a given network are provided with more computing, network connectivity, and storage resources than either client terminals or administrative consoles although they may all be implemented using similar computer systems. Referring to FIG. 1A. The Client/Server Network of the present invention may include one or more servers and one or more clients. The network should comprise at least one server, however, this server need not be a dedicated server. The server may comprise one or more computer systems 30 which may include one or more central processing units (CPU) 31, read only memory (ROM) 32, random access memory (RAM) 33, expansion RAM 34, input/output (I/O) circuitry 35, display assembly 36, input device 37, and expansion bus 38. Computer system 30 may also optionally include a mass storage unit 39 such as a disk drive unit or nonvolatile memory such as flash memory and a real-time clock 40. In one embodiment, mass storage unit 39 may include units which utilizes removable computer readable media, such as floppy disks, opto-magnetic media, optical media, and the like for the storage of programs and data.

CPU 31 is a computational device such as but not limited to an analog, digital, optical or biological processor. For example, CPU 31 may be a microprocessor. CPU 31 is coupled to ROM 32 by a data bus 41, control bus 42, and address bus 43. ROM 32 may partially contain the basic operating system for the computer system 30. CPU 31 is also connected to RAM 33 by busses 41, 42, and 43 to permit the use of RAM 33 as scratch pad memory. Expansion RAM 34 is optionally coupled to RAM 33 for use by CPU 31. CPU 31 is also coupled to the I/O circuitry 35 by data bus 41, control bus 42, and address bus 43 to permit data transfers with peripheral devices.

I/O circuitry 35 typically includes a number of latches, registers and direct memory access (DMA) controllers. The purpose of I/O circuitry 35 is to provide an interface between CPU 31 and such peripheral devices as display assembly 36, input device 37, and mass storage 39. Display assembly 36 of computer system 30 is an output device for displaying objects and other visual representations of data. The screen for display assembly 36 can be a device that uses a cathode-ray tube (CRT), liquid crystal display (LCD). or the like, of the types commercially available from a variety of manufacturers. Input device 37 can be a keyboard, a mouse, a stylus working in cooperation with a position-sensing display, or the like. Therefore, as used herein, the term input device will refer to any mechanism or device for entering data and/or pointing to a particular location on a screen of a computer display. The aforementioned input devices are available from a variety of vendors and are well known in the art.

Some type of mass storage 39 is generally considered desirable. However, mass storage 39 can be eliminated by providing a sufficient amount of RAM 33 and expansion RAM 34 to store user application programs and data. In that case, RAMs 33 and 34 can optionally be provided with a backup battery to prevent the loss of data even when computer system 30 is turned off. However, it is generally desirable to have some type of long term mass storage 39 such as a commercially available hard disk drive, nonvolatile memory such as flash memory, battery backed RAM, PC-data cards, or the like.

In operation, information is inputted into the computer system 30 by any suitable means such as but not limited to typing on a keyboard, manipulating a mouse or trackball, or "writing' on a tablet or on a position-sensing screen (not shown) associated with display assembly 36 CPU 31 then processes the data under control of an operating system and an application program stored in ROM 32 and/or RAM 33. CPU 31 then typically produces data which is outputted to the display assembly 36 to produce appropriate images on its screen.

Expansion bus 38 is coupled to data bus 41, control bus 42, and address bus 43. Expansion bus 38 provides extra ports to couple devices such as network interface circuits, modems, display switches, microphones, speakers, etc. to CPU 31. On some computers. the network interface circuit may be built in instead of being provided through expansion bus 38. Regardless, network communication is accomplished through the network interface circuit and an appropriate network Still further, the present invention relates to machine readable media on which are stored program instructions for performing operations on a computer. Such media includes by way of example, magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile Item such as a hard disk drive or RAM provided in a computer.

The network of the present invention includes a pool master 20 which can be, for example a generic server which can be but is not limited to an RPC server. The server need not be a dedicated server. All the clients 21 have a means of connecting to the pool master 20. The pool master is a request dispatcher and an agent controller. When the client makes a request, the pool master 20 will transmit the request to a pool agent 23 for transaction processing. The pool agent is a transaction processor which performs one or more functions where the totality of the functions is an application, file transfer, database processor, credentials processor or all the functions which together represent a web server.

When the communication is done through, for example, a connection oriented protocol such as TCP/IP, the Client first issues a connection request to the pool master 20, which will assign one or more pool agents 23 to the client. Then the client, communicates directly to the agent using its own communication channel 24. The pool agent 23 informs the pool master 20 whenever requests have been transmitted on such channel. The pool master 20 is configured through a configuration file which describes the pool attributes in terms of logging, services, operating system parameters and pool agents. Once the process pool is started, most of the configuration parameters may be changed dynamically using the pool application manager 22. The presence of a pool application manager, however is not always required in the operation of the present invention.

The pool application manager is a program that communicates with other programs that respect the protocol. The application manager operates such that when an application starts it registers itself with the application manager as a an application. When the developer designs the application the programmer can define "verbs" or sentences which are associated with functions in the code. When such verbs are received through its "application channel", the associated function is executed. A generic application, called the application manager is a client to all registered applications and can send verbs to be executed by the application, while it runs. The application manager permits dynamic change in any configuration variable of a running application, terminate the process properly (i.e., the application will go through its termination phase and clean up after itself), retrieve status from a running application at regular intervals thereby monitoring the application. Thus, the application manager acts as a remote control for any registered application running on any host.

Transaction processing is done by the pool agents. Agents are application specific. However they all have a common process pool interface which gives them a common behavior. When any agent has been idle i.e., has not received any processing requests for a preselected time, the agent recognizes that it is not required any longer and it terminates on its own. This feature allows a pool to shrink when it is not being used and releases resources for other uses.

The application manager 22 provides monitoring and well as dynamic configuration capabilities. Almost all configuration parameters may be dynamically changed once the pool is started. In a monitor mode, the pool application manager 22 communicates with the pool master 20, at predetermined intervals, and receives data on the workload.

Figure 17:
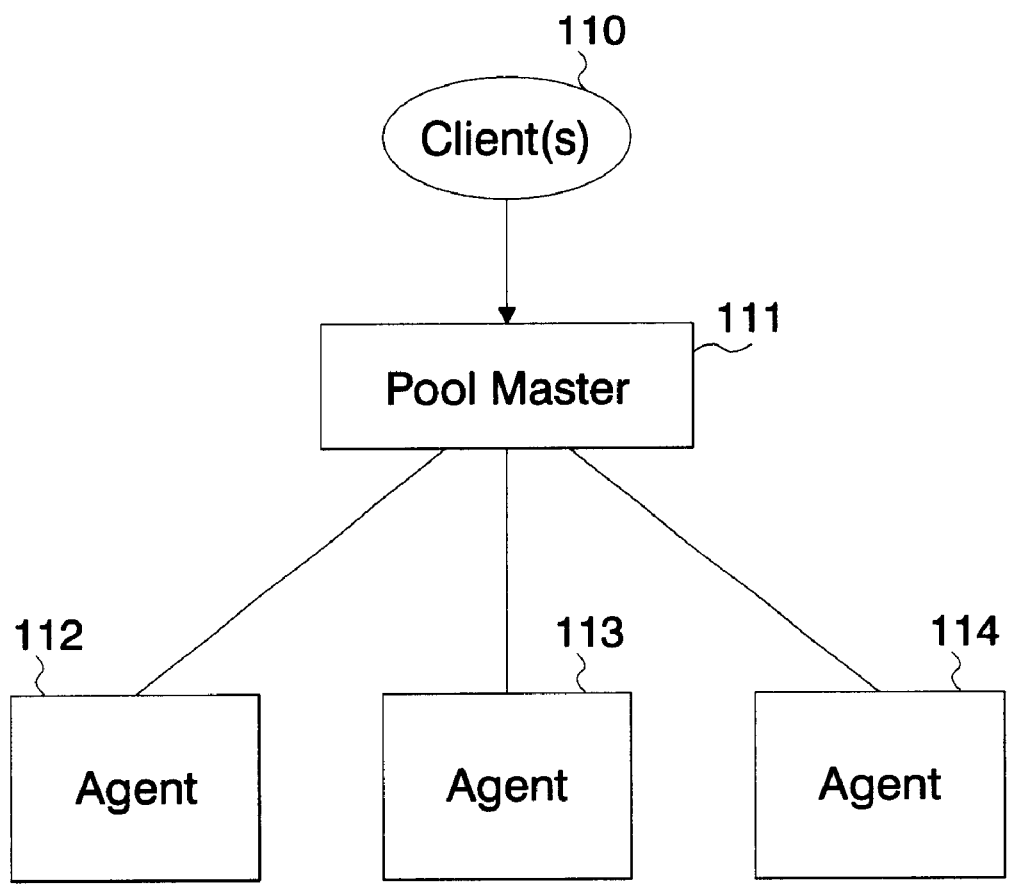
FIG. 17 is a diagrammatic representation of the process pool of the present where the master creates a number of pool agents.
Figure 18:
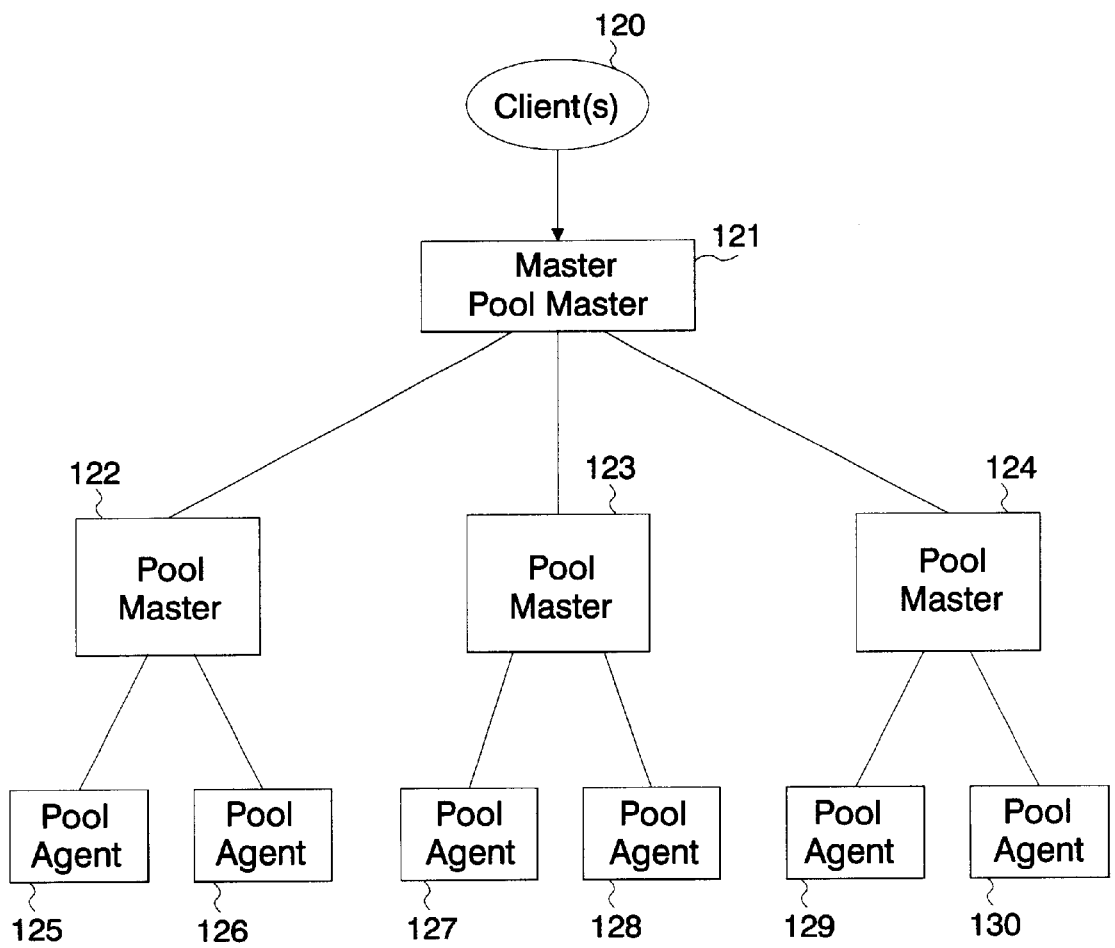
FIG. 18 is a diagrammatic representation of the process pool of the present invention where there is a master pool master connected to a number of pool masters.
Figure 19:
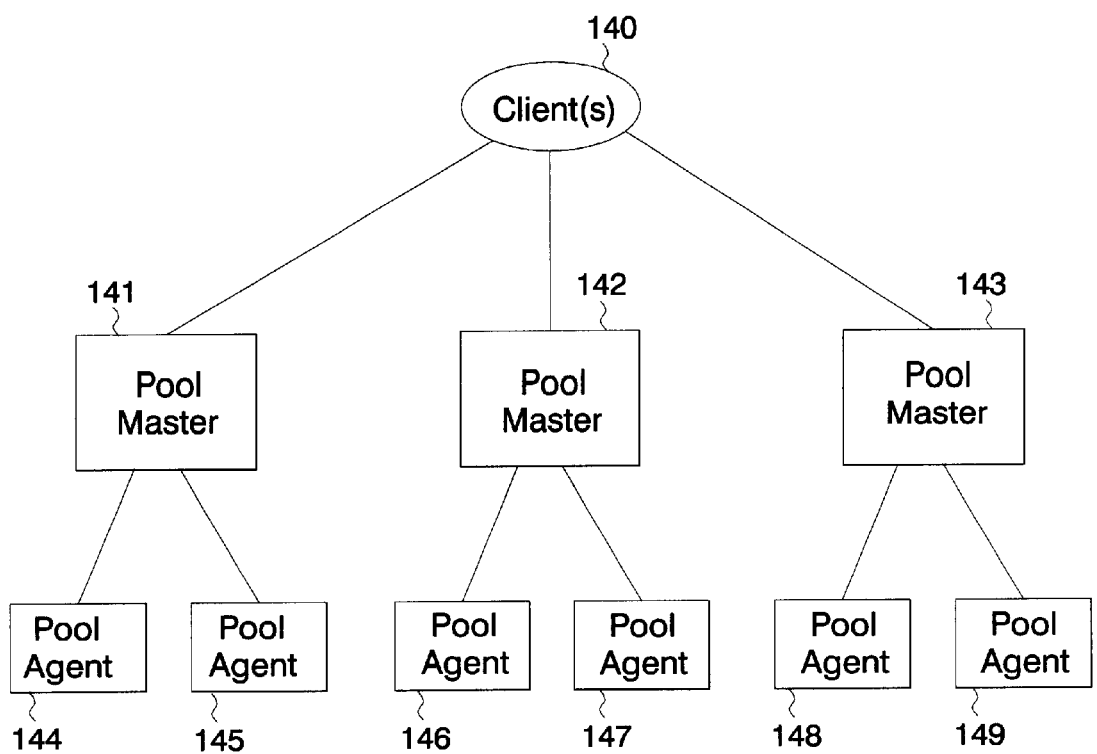
FIG. 19 is a diagrammatic representation of the process pool of the present invention where there are more than one pool masters creating agents.
Figure 20:
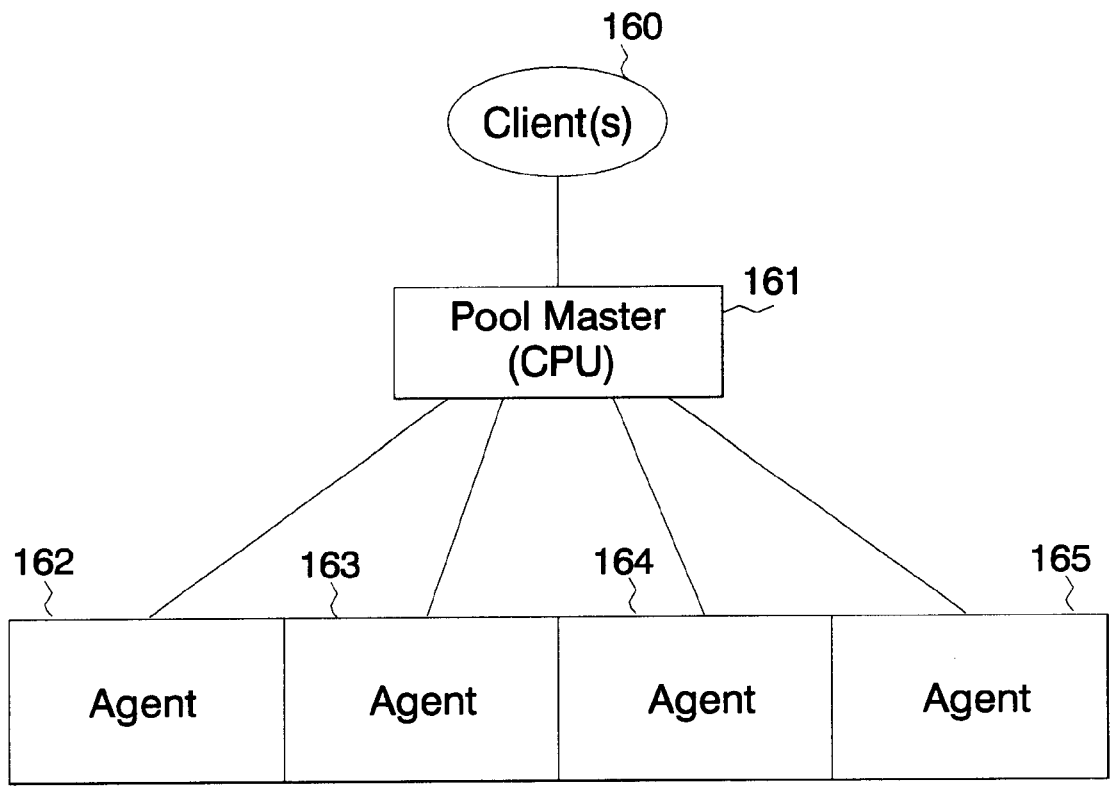
FIG. 20 is a diagrammatic representation of the process pool of the present invention in an Internet client server network.

In one embodiment of the present invention as shown in FIG. 17, there are any number of clients 110 that are connected to the pool master 111. The master creates agents 112, 113, 114, etc. as required. In another embodiment shown in FIG. 18 there are any number of clients 120 which are connected to a master pool master 121. The master pool master is in turn connected to one or more pool masters 122, 123, 124, etc. Pool master 122 can create one or more pool agents 125, 126, etc. as required. Similarly, pool masters 123 and 124 will each create one or more pool agents 127, 128, 129, 130 etc. In FIG. 19 the one or more clients 140 are connected to more than one pool master. In this case three pool masters are shown, 141, 142, 143 although any number is possible. Each pool master creates pool agents 144, 145, 146, 147, 148, 149 etc. as required. When more than one master is present before the first connection between a client and the pool master is made the client has to send a broadcast message to choose a master. One master will respond. When you have the master of pool masters as seen in FIG. 18 there is no need for the client to broadcast. More than one master is possible in a network as long as there is a communication protocol between the masters. As shown in FIG. 20 one or more clients 160 are on the Internet and access the pool master at an Internet service provider (ISP). The pool master may be, for example, a high speed processor (CPU) 161. The agents 162, 163, 164, 165 etc. may, for example, be CPU's connected with the master, such as, by a private backbone of fiber optics. Even in the other pools shown herein including, for example, FIGS. 17, 18, and 19 the pool agents may be CPUs The pool parameters are set forth in a configuration file read by the pool master upon startup. FIG. 3 is a representation of a configuration file for the present invention. The configuration file has three sections:

a pool master section provides the pool master with specific information;

a pool agent section giving configuration parameters to the pool agent;

an environment section allowing the pool master to define environment variables for the pool agent to use. (i.e.: Database name, Libraries, etc. . . . )

The pool master section of the configuration file typically sets out the following parameters:

Process Pool Identification

This is the unique identification used by the Clients to communicate to the pool. In an ONC RPC implementation the identification is a quartet of values consisting of:

ONC RPC Program Number

In an ONC RPC implementation the Program Number selected is a number consistent with the user's particular system.

ONC RPC Program Version

In an ONC RPC implementation the Program Version selected is also a number consistent with the user's particular system.

ONC RPC Server

This is the name of the process pool Host.

ONC RPC Protocol

This is the identification of the communication protocol that will be used by clients to communicate. It may be any suitable protocol such as for example but not limited to UDP, TCP or both depending on the server.

Kill Timeout

When the process pool is shutting down, the master requests all the agents to shut down. The master then waits the selected kill timeout period for the agents to shut down. After the first kill timeout period expires a termination interrupt is sent to the agents. When the kill timeout period passes a second time any remaining agents are terminated. The kill timeout may be any number, however, the kill timeout should not be shorter than the longest period of time that an application specific transaction can take.

Minimum Agent

This defines the minimum number of agents to have running at all times. If an agent dies, the pool master will ensure that there are at least this minimum number of agents running. Typically, the minimum agent is any whole number greater than or equal to one.

Log File

This configuration applies to both the pool master and the pool agent and contains the name of the log file to use which is the file name excluding any directory. The log file is the file where the process pool records everything it does. However, in the pool agent section, the log file might be changed by the agent on a per-transaction basis. In this case, the log file in the configuration file will only contain global agent logs (i.e.: RPC reports, Communications, etc.)

Log Size

This is a parameter of both the pool master and the pool agent and defines the maximum size in kilobytes the Log File may grow to be. The Logging mechanism provides a Space Protection System which ensures that a Log File will not take the entire disk space available. The log value is the number of bytes compatible with the user's system. A value of 0 indicates an infinite number.

Log Level

This is a list of Logging levels to be enabled at startup and includes the details on a list of keywords: All, Trace, Info, Debug, Warning, Fatal, Rpc, Process, User1, User2, . . . , User24. The log level is a parameter of both the pool master and the pool agent. Logging levels may be regulated during runtime using the process pool application manager.

Log Host

The log host name or host address identifies where the log daemon is running. The process pool is compatible with the log daemon. The log daemon provides a capability to have log files centralized and serviced by a single host.

CPU Limit

The CPU limit defines the maximum number of CPU cycles in seconds allowed to process a transaction. As a security measure against destructive bugs which cause a process to hang-up an entire CPU, the pool master and agents ensure that the CPU will not be used more than the above value while servicing a transaction. The CPU limit is a parameter of both the pool master and pool agent.

CPU Priority.

The CPU priority measures the pre-emptiveness of the process pool and agent on the remaining of the CPU.

Alarm

The alarm describes the maximum number of seconds allowed to process a transaction. When processing a transaction, an alarm is set. If the transaction is not completed within the allocated time frame, the transaction is aborted.

Max Idle Time

The max idle time sets forth the maximum number of seconds an agent should wait, unused, before quitting. When the idle time is reached and the agent has not been solicited, it will die, thus shrinking the process pool.

Environment Section Parameters

Each variable in the Environment Section will be defined for each Agent. This section allows an already defined variable to be over-written only within the context of the Process Pool. The log size, log file, log level, log host, CPU limit, CPU priority, alarm are parameters of both the pool master and the pool agent. The max idle time and the environment section components are parameters of the pool agent.

As is evident in the above discussion of the process pool parameters some of the variables may have a dramatic performance impact on the process pool. For example, Setting a short alarm period may cause all transactions to be aborted.

Setting a too high kill timeout will never shrink the pool.

Operating System Parameters

Some parameters are global to the Operating System. These include the following:

CPU Priority

The CPU Priority factor is considered on heavily used Systems. Changing its value will affect the number of times the Operating System will give the process pool the CPU. It works as a priority scheme where the higher the number, the lower the priority, thus the less often the CPU is available. On a dedicated server, the CPU Priority should be raised since no other process should use the CPU. On shared systems, it would not have to be modified since its default value provide neutral behavior, neither preemptive, nor passive.

CPU Limit

The CPU Limit parameter should be set greater than the maximum time and preferably to at least twice the maximum time used for the longest of all transactions serviceable by the pool agent. This parameter is provided to automatically abort bogus transactions that would result in a CPU being over-taken by an pool agent. If the value of the CPU limit has been modified, if the CPU Limit becomes active (e.g., aborting transactions), the previous value for the CPU limit should be restored.

Alarm

The main difference between the alarm and the CPU Limit is that the CPU Limit is a function of CPU Cycles and the Alarm is a function of the Time(e.g., a transaction could have the CPU for only 1 second in a 10 seconds interval period.) The alarm is intended to detect transactions waiting too long for an event to occur. (e.g. if a hard drive failure causes a file to be opened too long, the alarm would abort the transaction). Preferably, the value of the alarm should be two to three times the value of the CPU Limit.

Agent Control Parameters

Minimum Agents

The minimum number of agents to have alive at all times. If agents could be created at no cost, they would be created whenever a request would come, they would service the request and then die.

The problem in having to start an agent for each request, is that it requires a lot of resources to start an agent. It is possible to have multiple users share one agent i.e., to have one Agent for 5 users. If more pool agents are required, they are created.

Maximum Idle Time

If the Maximum Idle Time is set too low, the process pool will lose time creating pool agents when existing agents just killed themselves because they were waiting for work. This value is difficult to evaluate and heuristic methods are best for this kind of parameter. However, the following should be considered:

1- The time the slowest user takes between transactions ?
2- The number of agent transactions in a business transaction ?
3- The length of time the Server resources can be allocated to non-working agents ?

Kill Timeout

This parameter affects only the shut-down of the process pool. It defines how much time is left for a non-terminated transaction to complete. When the pool master dies, it tries to make sure no pool agents are still running.

Process Pool Architecture

The use of the configuration parameters will now be described to demonstrate how the process pool operates. A distinction is made between the protocols used since the behavior of the process differs whether a connection oriented protocol such as TCP/IP is used or not. However, some steps are always the same, regardless of the protocol used.

Pool Architecture Common to Connection Oriented Protocol and Connectionless Oriented Protocol

Start-up of a Process Pool

Figure 4:
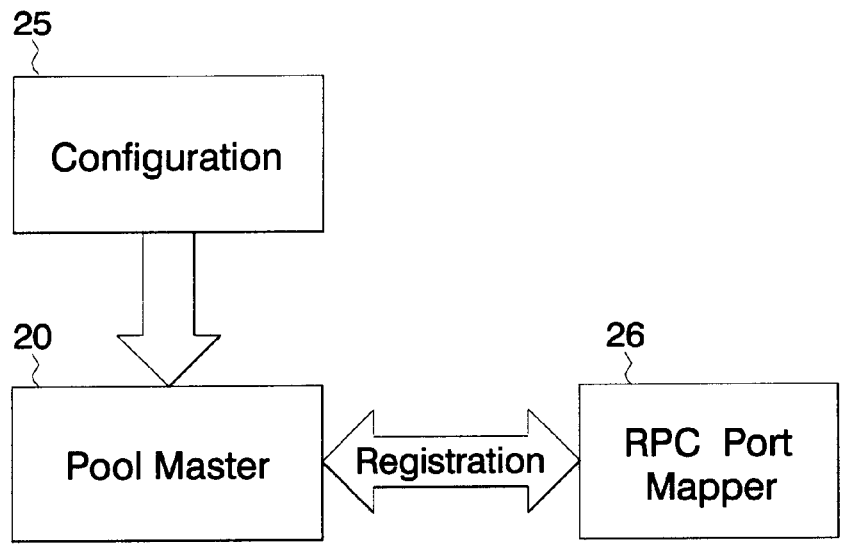
FIGS. 4 and 5 are diagrammatic representations showing the startup of the process pool.
Figure 5:
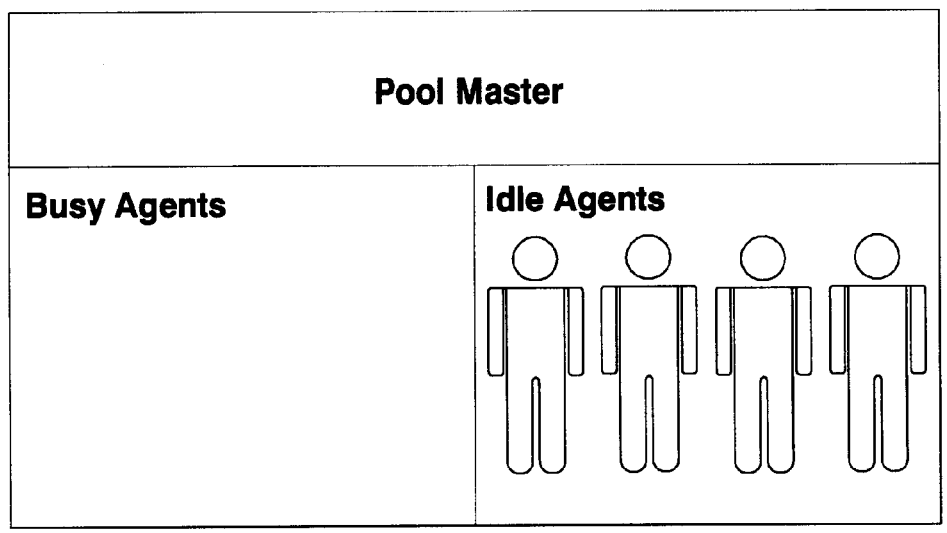

As shown in FIGS. 4 and 5, when the pool master 20 starts, it first reads the configuration file 25, then registers itself with the network connection service i.e., the port mapper 26 in an ONC RPC implementation. Once successfully registered the pool master 20 then starts the minimum agent 27 that must be running. The pool master sets up its operating system parameters and stands in readiness waiting for requests to arrive.

Shutdown of a Process Pool

Figure 6:
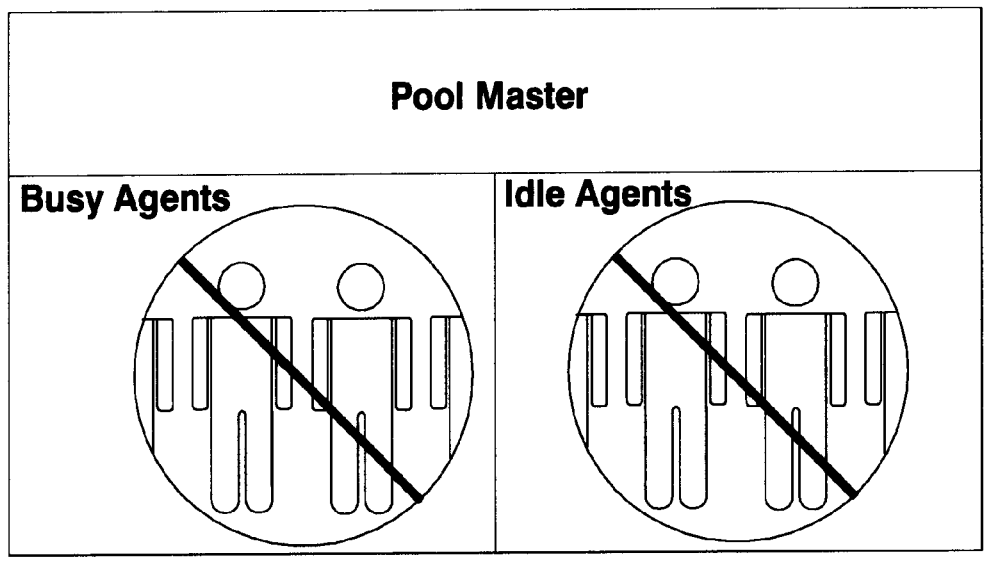
FIG. 6, 7 and 8 are diagrammatic representations showing the shut down of the process pool.
Figure 7:
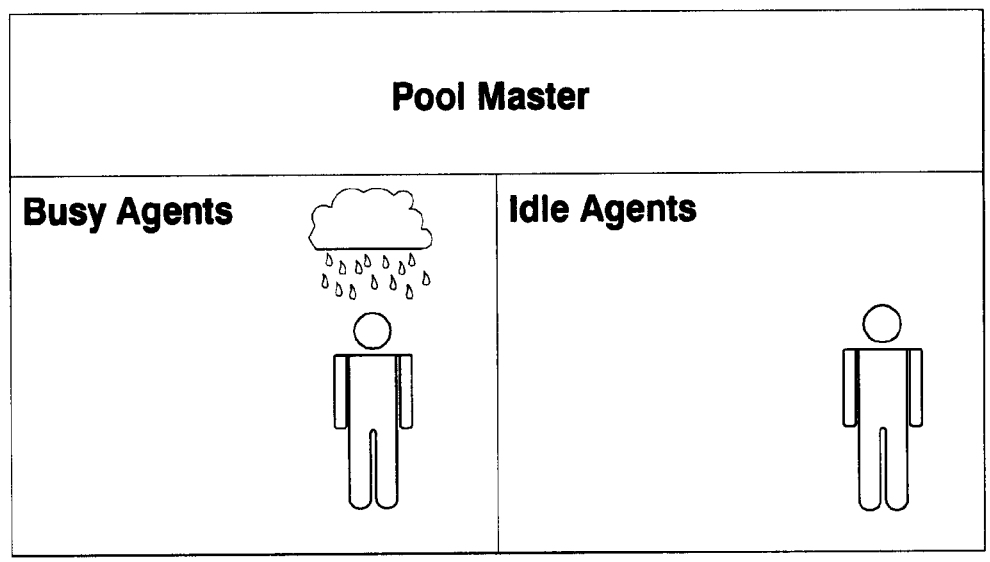
Figure 8:
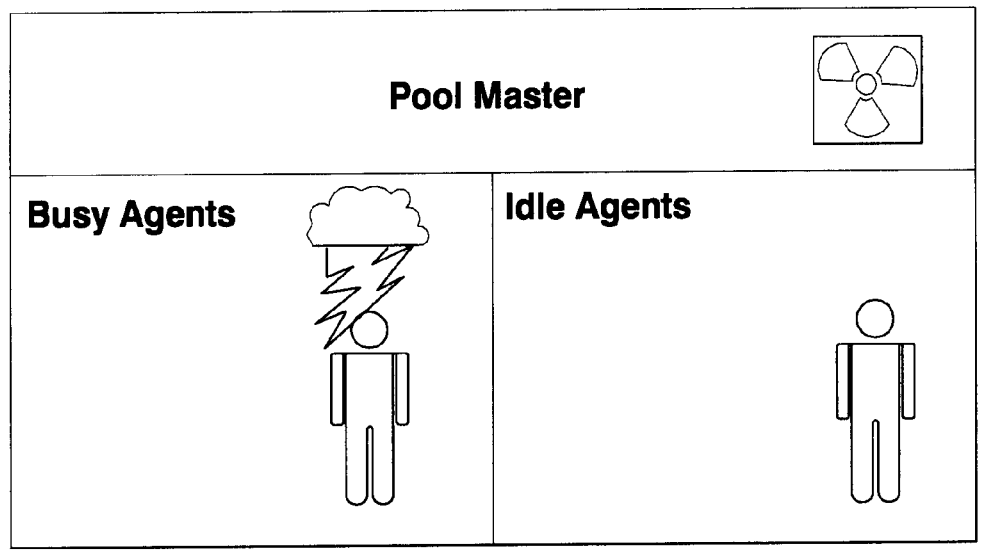

As depicted in FIG. 6, upon shutdown of a process pool, the pool master will send a message to all agents to die, then wait for the kill timeout seconds to pass. After the timeout has expired, if some agents still remain, the pool master 20 will send them a normal termination interrupt and wait another kill timeout period. See FIG. 7. After the timeout expires again, if left over pool agents still remain, the pool master will abort and terminate itself. See FIG. 8.

Connectionless Process Pool Such as UDP/IP

In this model, clients request transactions and each request is an atomic operation independent from other transactions. Moreover, each transaction with the same parameters will always give the same result. For instance, to retrieve the list of users belonging to a group, the transaction parameter is the group name or Id, and the result will always be the same list of users. On the other hand, when creating an entity such as a data or information artifact the process always returns a different entity Identification Number.

Figure 9:
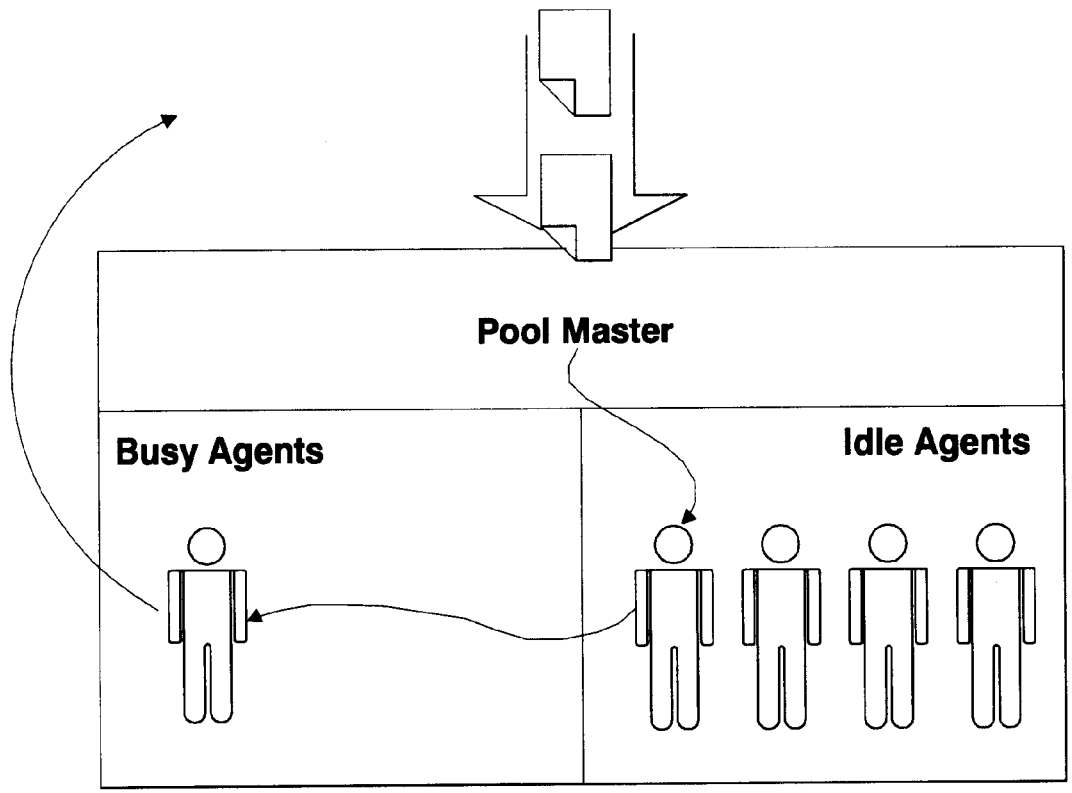
FIGS. 9, 10 and 11 are diagrammatic representations showing the establishment of a process pool using a connectionless protocol such as UDP/IP.
Figure 10:
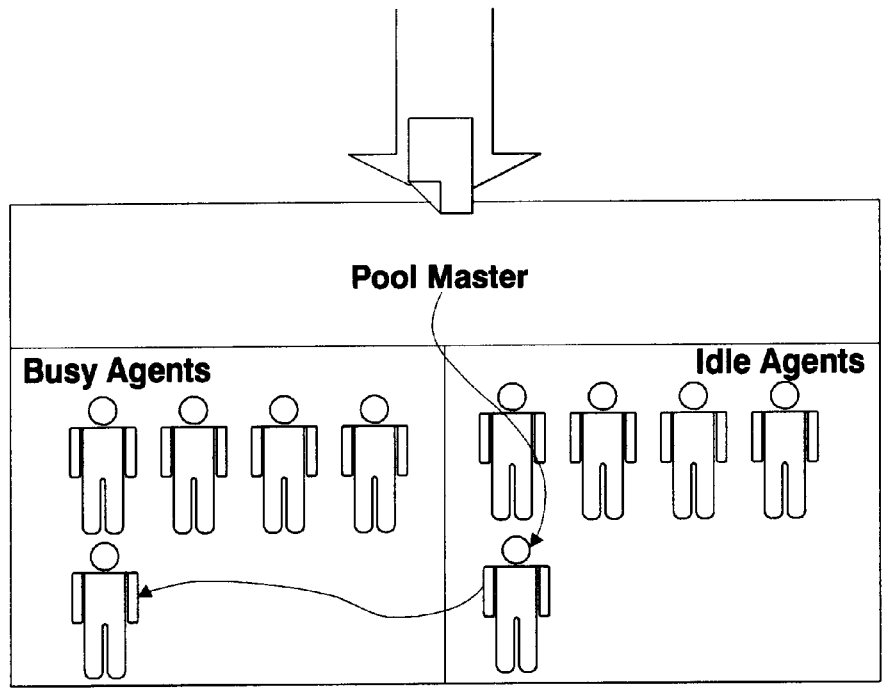
Figure 11:
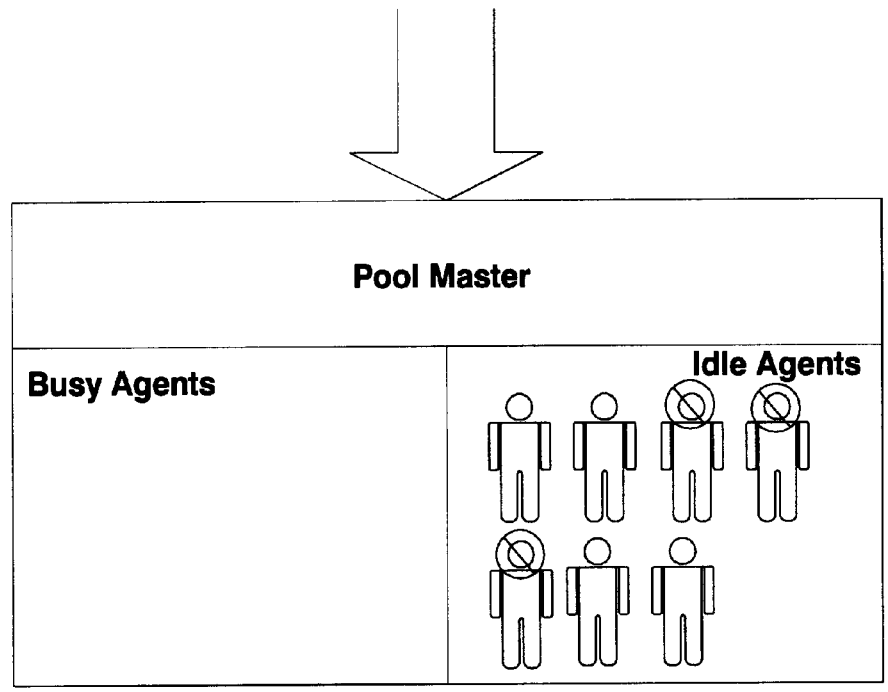

As seen in FIG. 9, when the pool master receives a transaction request, it transferred to the first available agent which then becomes busy. If all agents are busy, as is the case in FIG. 10, when a transaction is received, the pool master will create a new agent. The new agent automatically becomes busy and is assigned the transaction. When one or more agents have been idle for maximum idle time, they terminate, and the pool shrinks. See FIG. 11. If the number of agents goes below the pre-determined minimum agents parameter, the master will restart new ones.

Connection Oriented Process Pool Such as TCP/IP

In this model, Clients establish a connection with the server and each have their own communication channel to the Server. The protocol ensures the delivery of the request, therefore there is no retry or timeout in the packet transport. Moreover, since the server has its own connection, transactions may have dependencies on other transactions:

For instance, Transaction 1 could be: get me the 10 first users in the group Group1. and Transaction 2 could be: get me the next 10. Transaction 2 repeated would give different results each time since they would be the 10 users after the last call.

Establishing the Connection

Figure 12:
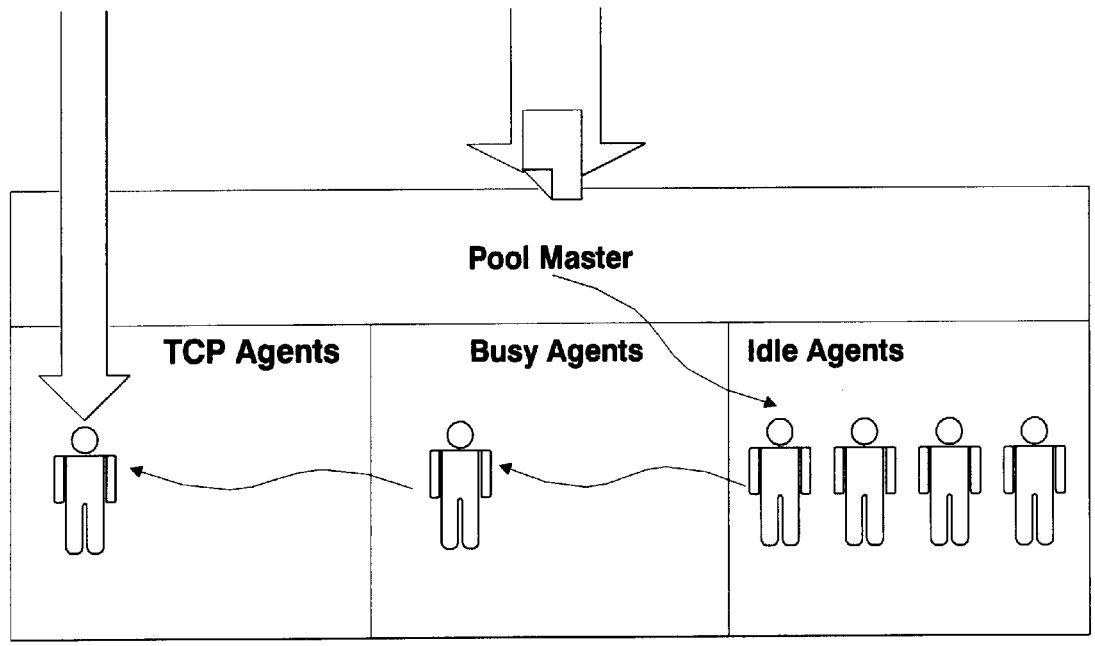
FIGS. 12 and 13 are diagrammatic representations showing the establishment of a process pool using a connection oriented protocol such as TCP/IP.

Prior to any transaction request, the Client application must request a connection to the pool master. The pool master selects and idle agents and gives that agent the request to process. The agent responds to the connection request by creating a privileged communication channel with the Client. From now on, the Client will talk directly to the agent, without going through the pool master. See FIG. 12.

Figure 13:
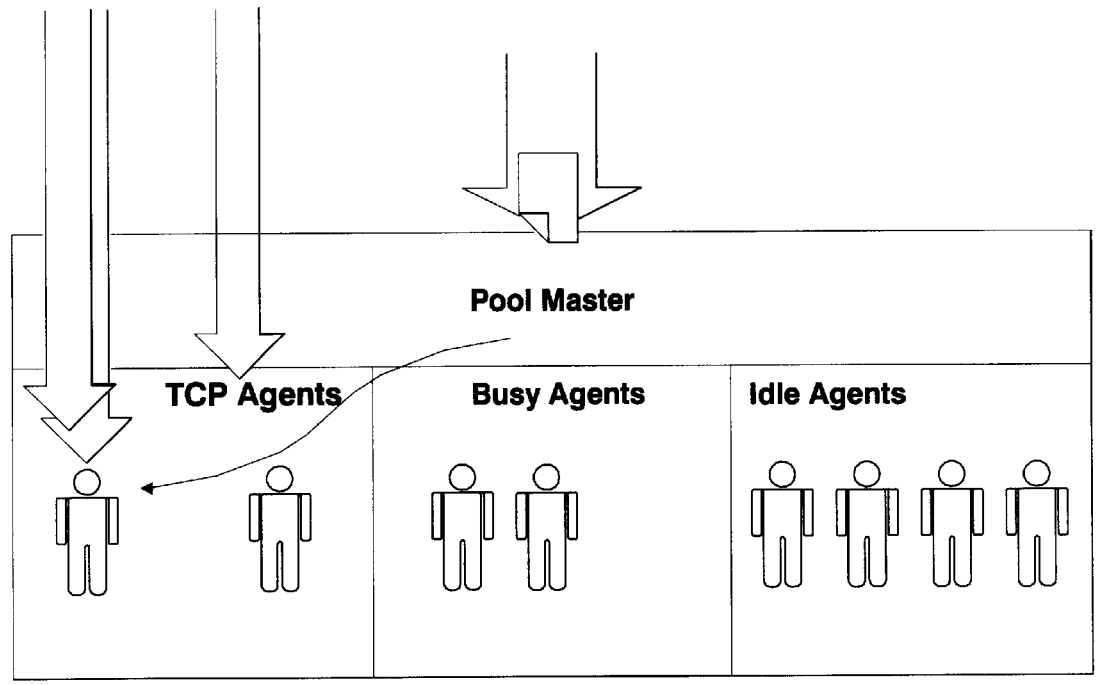

If there are no idle agents available when the pool master receives a connection request, the pool master will not create a new one, instead he will find an agent with resources available provided this agent is not already servicing its maximum capacity and pass the request. In the TCP mode, the pool master creates new agents only when all agents are at full capacity. See FIG. 13

Request Processing

Figure 14:
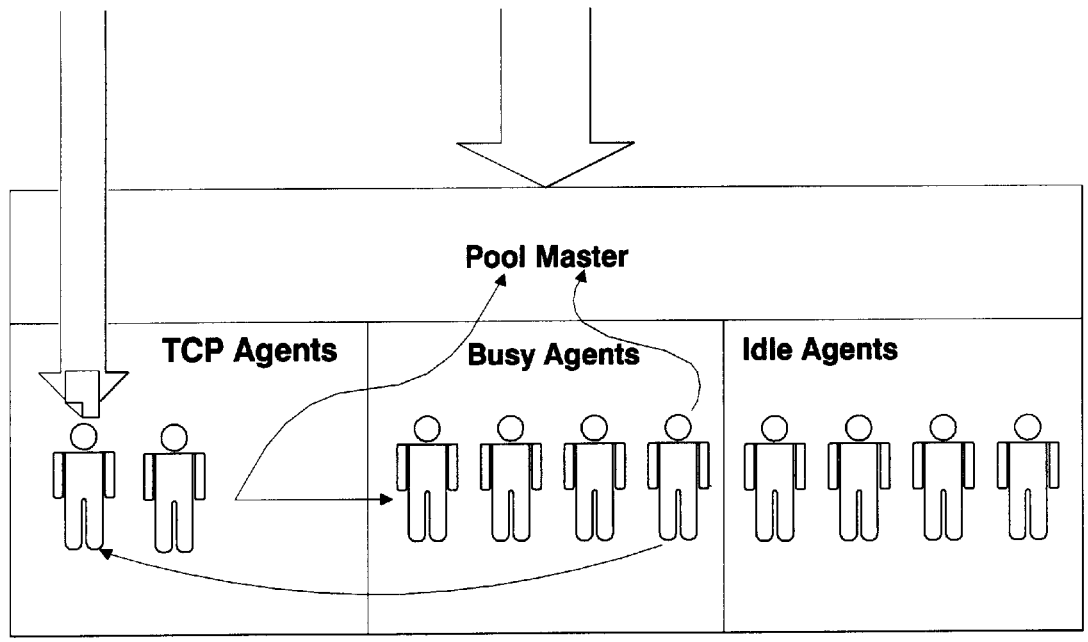
FIG. 14 is a diagrammatic representation demonstrating request processing in a connection oriented protocol such as a TCP/IP process pool.

Since Clients have privileged communications with their agent, the pool master is not aware of when an agent is busy or waiting for a request. The agent will notify the pool master whenever the agent becomes busy. Thus, the pool master can properly assign new connections and report accurate data to the application manager. The agent will notify the pool master when the transaction has been processed and the agent becomes available again. See FIG. 14.

Dual Protocol Process Pool

Figure 15:
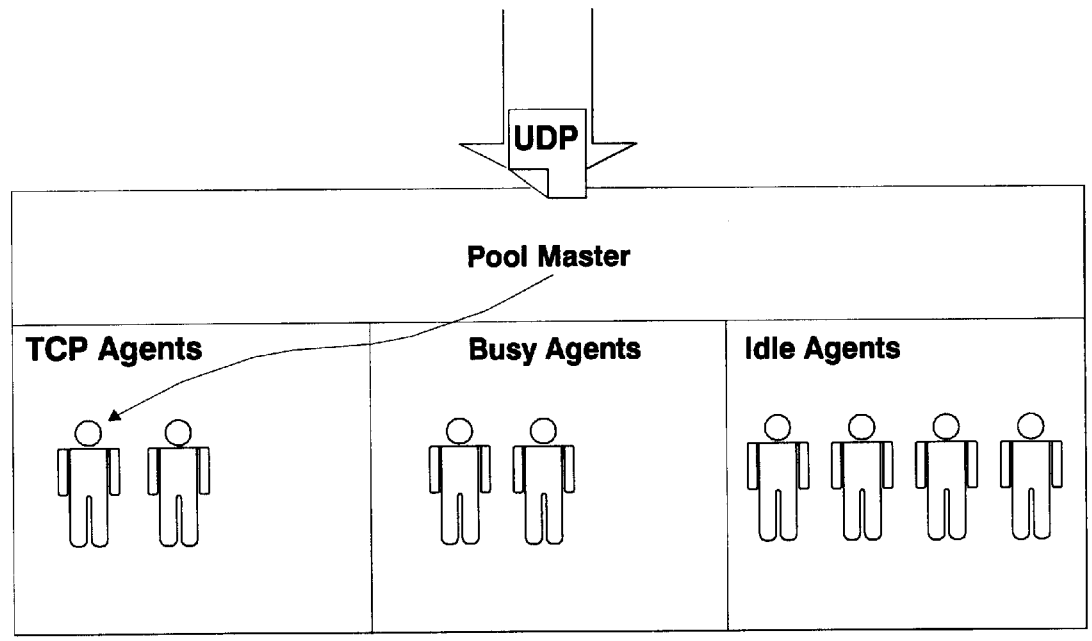
FIG. 15 is a diagrammatical representation illustrating a dual protocol process pool.

A dual protocol pool is a process pool that supports both connection and connectionless protocols. In dual protocol pools, some requests may be requested on the connection channel and other requests on the connectionless channel. The connectionless requests don't change in dual process pools because of the privileged communication channel. However, there is a small modification of the dispatch routine when there is a connection request. When a connection request is submitted to the pool master but all agents are either busy or are connectionless Agents the connection request will be dispatched to the first connectionless Agent that is not busy at the time. This occurs because it is very expensive in resources to create a new agent. See FIG. 15.

EXAMPLE

The benefits of the present invention may be seen from the following example.

The system has a client/server call tracking and workflow system. The user can access the system using an MS Windows-based client software on the PC's. The users are presented with a model for tracking and accessing customer calls. Client functions include creating, updating, routing customer calls and performing various other categories, such as mainframe transactions, and viewing images relating to the customer calls. Specifically, there is a dedicated server process per client upon successful credentials validation.

In this example of the process pool, an RPC server provides access to a database. Some of the features of the process pool are:

Each process pool master controls access to one database.

Multiple masters may be run on a single host each of which controlling a different database.

The RPC program and version numbers are determined by the system implementor.

Figure 16:
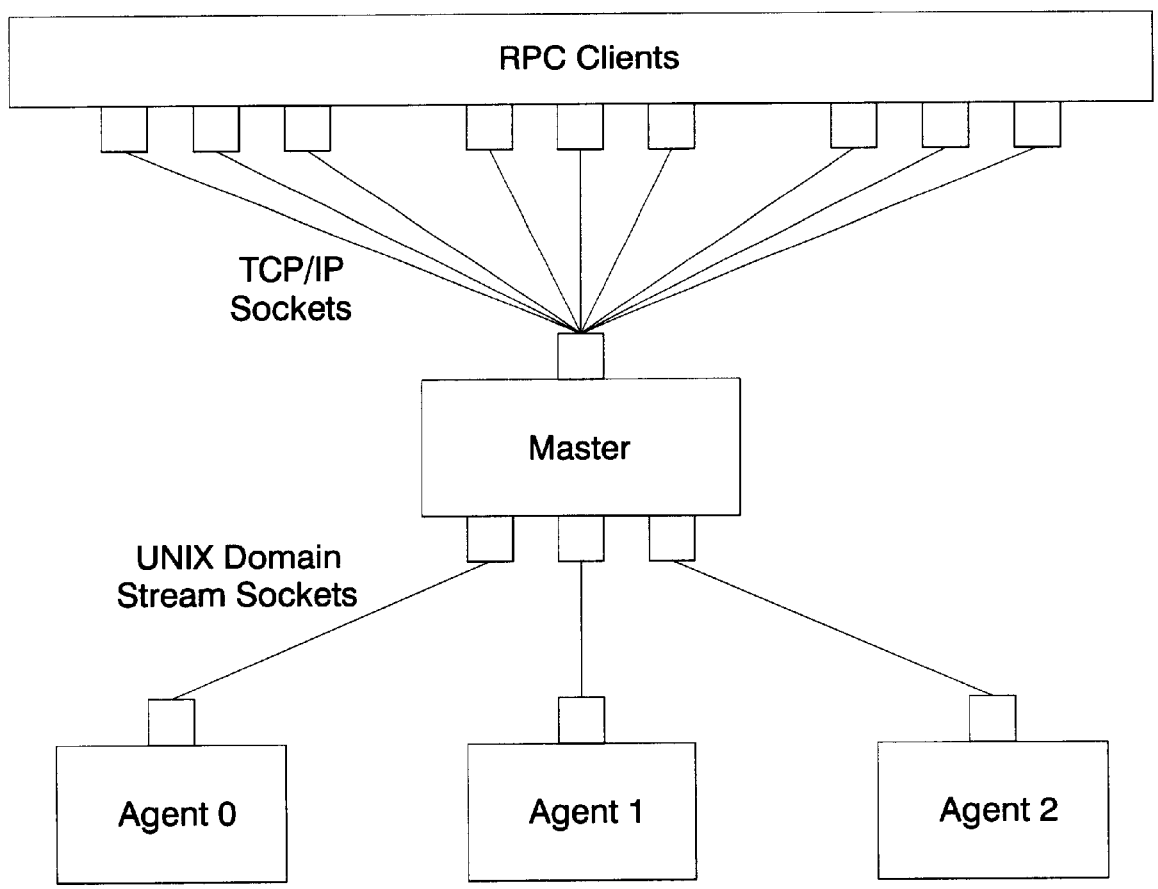
FIG. 16 is diagrammatic representation of the process pool of the present invention using a master daemon.

The process and communication architecture of the process pool is outlined in FIG. 16. The RPC clients establish communication with the pool master by looking up its TCP/IP port number with the system portmapper server. The pool master performs the following functions:

Starts a pre-defined number of agents.

Registers as an RPC server with the portmapper.

Dispatches each incoming RPC to an available agent by sending the client's database logon information and TCP/IP socket descriptor.

The agents receive notification of the RPC's from the pool master and process the service requests. Reply to the clients is made directly from the agents by using the TCP/IP socket descriptor passed from the master.

With the process pool architecture, the client application contacts the master to establish a connection to the database. The master is an RPC server which is contacted in the standard manner through the port mapper. The program and version numbers assigned to the daemon are up to the system implementor to determine. Once the RPC client handle for the agent is created, the application must call a credential validation to establish a database connection. The RPC client handle returned by this function is used for all subsequent RPC functions. This architecture allows the client application to have process pool connections open within the same process context. When the client application has no further need to communicate to the agent, it issues a credentials release.

All of the RPC's are stateless, which means that any available agent can service any request. For example, if a given client issues a getobject RPC in order to retrieve the data for a customer call, this will be serviced by a particular agent, say $A_0$. If the next RPC issued by the client is getprofile, this RPC may be serviced by another agent, $A_1$. This architecture allows for fewer agents to be run than there are clients, since at any given time only a subset of the clients are likely to be actively issuing RPC's.

Process Pool Comparison With Prior Client/Server Applications

Table 1 is Implementation Model A showing the operation of a typical prior art client/ server model where there is a dedicated pool agent.

Table 2 is Implementation Model B where there are a fixed number of agents. The protocol is a connectionless protocol.

Table 3 is Implementation C where there are a fixed number of pool agents and the protocol is a connection protocol.

Table 4 is the process pool Implementation of the present invention for a connectionless protocol.

Table 5 is the process pool Implementation of the present invention for a connection protocol.

As shown in table 4 the Server starts up and registers itself as "being alive". The Server starts "X" number of agents (where X is a predetermined number based on the system's complexity). At the same time a first Pool Agent 1 initializes and sets a timeout for a predetermined period of time. The server becomes idle and waits for a connections request from a client application. Pool Agent 1 also becomes idle. When a client application initiates a communication, the Server receives the communication request and finds an agent with available resources. If no agent is found, the Server creates a new Agent and selects it for the application. As communication is established with the Server by the Client Application, the Server forwards the request to the selected Agent which in turn accepts the connection. The Server thereupon becomes idle. The Client application sends a request which is received by the Pool Agent. The Pool Agent processes the request, responds to the request and later becomes idle. The Client application receives the response from the Pool Agent. Additional requests maybe received by the pool agent from the Client Application. When such requests are received by the Pool Agent it processes the request and responds to the request. When the Client Application terminates communication, the Pool Agent closes communication and decrements the server counter of "live" connections according to a weighted scheme where users receive priority over any number of nonuser applications. Thereupon the first Pool Agent becomes idle. If the Pool Agent remains idle for more than the predetermined period of time the Pool Agent times out and the process terminates. The Server recognizes that the Pool Agent has died. If there are fewer agents than the number that was predetermined the Server will create a new Agent.

If at any point during the first Client Application's communication with the Server of the Pool Agent a second Client Application 2 initiates a communication and establishes communication with the Server. The Server receives the communication request and finds an Agent with available resources. The second Client Application sends a request to the Server. If no Agent is found with available resources the Server creates a new Pool Agent and selects it to process the Client Application request. The second Pool Agent accepts the connection from the Pool Agent and initializes. When the second Pool Agent initializes it sets a timeout to a predetermined time period. When the Server forwards the request from Client Application to the Pool Agent, the Pool Agent accepts the connection, receives the request. After processing the request the second Pool Agent responds to the client application. After responding to the request the second pool Agent becomes idle. If the second Pool Agent remains idle for more than the predetermined period of time the second Pool Agent times out and the process terminates. The Server recognizes that the second Pool Agent has died. If there are fewer agents than the number that was predetermined the Server will thereupon create a new Agent.

The advantages of the present invention include optimizing server resources. When an agent is idle for too long a period of time it will terminate thus releasing server resources. In addition, there are a variable number of agents. As a result, if there are a large number of clients more agents will be created thus fulfilling the need for more agents. The number of agents existing becomes a function of the real workload as opposed to an estimation of the workload. As a result, the server resources are used to their optimum. The arrangement of Table 4 can also be configured to operate in the manner of the models depicted in Table 1–3. Table 5 is the process pool implementation of the present invention for a connection protocol as opposed to the connectionless protocol of Table 4. The arrangement of Table 5 can also be configured to operate in the manner of the models depicted in Tables 1–3.

TABLE 1

Process Pool Comparison with "Regular" Client/Server Applications
Implementation Model A
Dedicated Agent

| Client Application | Server Application | Server Agent |
|---|---|---|
| | START OF SERVER | |
| | Registers itself as "being alive" | |
| | Becomes Idle | |
| | (Wait for connections requests) | |
| Initiate Communication | Receives Communication Request | |
| | Creates an Agent | Initializes |
| | Forwards the request to the agent | Accepts the request |
| Communication is established with the Agent | Becomes Idle | Becomes Idle |
| Sends a Request | | Receives the request |
| | | Processes the request |
| Receives the Response | | Responds to the request |
| <PROCESSES MULTIPLE REQUESTS> | | . . . |
| Terminates communication | | Closes communication |
| | | Process Terminates |

Problems with this model:
1. There is one agent per client. Therefore if there are a large number of clients, there will be a large number of agents. Hence the Server requires a lot of Resources
2. Creating a Process is a very expensive operation in a server. It takes a lot of I/O resources, Memory and time.
3. If there are a lot of client processing a small number of requests, the Server will spend on average more time creating agents than actually doing the work.

TABLE 2

Implementation Model B
Fixed number of Agents (Connection less: i.e. UDP/IP)

| Client Application | Server Application | Server Agent 1 | Server Agent 2 | Server Agent x |
|---|---|---|---|---|
| | START OF SERVER | | | |
| | Registers itself as "being alive" | | | |
| | Starts X Agents (where X is configurable) | Initializes | Initializes | Initializes |
| | Sets the current agent to 1 | Becomes Idle | Becomes Idle | Becomes Idle |
| | Becomes Idle | | | |
| | (Wait for connections requests) | | | |
| Initiate Communication | Receives Communication Request | | | |
| Communication is established with the Server | Accepts the Request | | | |
| Sends a Request | Sends the request to the current agent | Receives the request | | |
| | Increments the current agent | Processes the request | | |
| Receives the Response | Becomes Idle | Responds to the request | | |
| Sends a Request | Sends the request to the current agent | | Receives the request | |
| | Increments the current agent | | Processes the request | |
| Receives the Response | Becomes Idle | | Responds to the request | |

TABLE 2-continued

Implementation Model B
Fixed number of Agents (Connection less: i.e. UDP/IP)

| Client Application | Server Application | Server Agent 1 | Server Agent 2 | Server Agent x |
|---|---|---|---|---|
| Terminates communication | Closes communication<br>END OF SERVER<br>Terminates Agent 1<br>Terminates Agent 2<br>Terminates Agent x<br><br>Process Terminates | Process Terminates | Process Terminates | Process Terminates |

Problems with this model:
1. There is a fixed number of agents. Therefore if there are a large number of clients, the response time is a function of the server configuration. If the server is configured with 10 agents and 20 clients submit a request simultaneously, 10 agents will have to wait.
2. If more agents have to be created, the server has to shutdown
3. If too many agents are configured, Some server resources are allocated but not used

TABLE 3

Implementation Model C
Fixed number of Agents (Connection oriented: i.e.: TCP/IP)

| Client Application 1 | Client Application 2 | Server Application | Server Agent 1 | Server Agent 2 |
|---|---|---|---|---|
| | | START OF SERVER<br>Registers itself as "being alive"<br>Starts X Agents (where X is configurable) | Initializes | Initializes |
| | | Sets the current agent to 1<br>Becomes Idle<br>(Wait for connections requests) | Becomes Idle | Becomes Idle |
| Initiate Communication<br>Communication is established with the Server | | Receives Communication Request<br>Forwards the request to the current agent | Accepts the Connection | |
| Sends a Request | | Increments the current agent<br>Becomes Idle | Receives the request<br>Processes the request<br>Responds to the request | |
| Receives the Response | | | | |
| Sends a Request | Initiate Communication<br>Communication is established with the Server | Receives Communication Request<br>Forwards the request to the current agent | | Accepts the Connection |
| | Sends a Request | Increments the current agent<br>Becomes Idle | | Receives the request<br>Processes the request<br>Responds to the request |
| Receives the Response | Receives the Response | | | |
| Terminates communication | | | Closes communication | |
| | Terminates communication | END OF SERVER<br>Terminates Agent 1<br>Terminates Agent 2<br>Process Terminates | Process Terminates | Closes communication<br><br>Process Terminates |

Problems with this model:
1. There is a fixed number of agents. Therefore if there are a large number of clients, the response time is a function of the server configuration. If the server is configured with 10 agents and 20 clients submit a request simultaneously, 10 agents will have to wait.
2. If more agents have to be created, the server has to shutdown
3. If too many agents are configured, Some server resources are allocated but not used

TABLE 4

Process Pool Implementation (Connection Less Protocol)
Variable number of Agents
NOTE: All configuration variables may be changed dynamically through the Application Manager

| Client Application 1 | Client Application 2 | Server Application | Server Agent 1 | Server Agent 2 |
|---|---|---|---|---|
| | | START OF SERVER<br>Registers itself as "being alive"<br>Start X Agents (where X is configurable) | Initializes<br>(Sets a timeout to Z minutes) | |
| | | Becomes Idle<br>(Wait for connections requests) | Becomes Idle | |
| Initiate Communication | | Receives Communication Request<br>Finds an Idle Agent | | |

TABLE 4-continued

Process Pool Implementation (Connection Less Protocol)
Variable number of Agents
NOTE: All configuration variables may be changed dynamically through the Application Manager

| Client Application 1 | Client Application 2 | Server Application | Server Agent 1 | Server Agent 2 |
|---|---|---|---|---|
| Sends a Request | | If no agent is found, create a new one and select it<br>Forwards the request to the selected agent | Receives the request | |
| Receives the Response | | Becomes Idle | Processes the request<br>Responds to the request<br>Becomes Idle | |
| Sends a Request | Initiate Communication<br>Communication is established with the Server | Receives Communication Request (from client Application 2)<br>Finds an Idle Agent | | |
| | Sends a Request | If no agent is found, create a new one and select it<br>Forwards the request to the selected agent | Receives the request<br>Processes the request | |
| | Receives the Response | Receives Communication Request (from client Application 1)<br>Finds an Idle Agent<br>If no agent is found, create a new one and select it<br>Forwards the request to the selected agent | Responds to the request<br>Becomes Idle | Receives the request |
| Receives the Response | | | | Processes the request<br>Responds to the request<br>Becomes Idle |
| Terminates communication | | | AGENT TIMEOUT<br>If Agent has been Idle for more than 'Z' minutes, it times-out | |
| | | Server 'catches' that the agent died.<br>As long as there are less than 'X' agents, create a new agent | | |

Advantages with this model:
1. When an Agent is Idle for too long, it will terminate. Thus releasing server resources.
2. There is a variable number of agents. Therefore if there are a large number of clients, more agents will be created.
3. The number of agents becomes a function of the real workload as opposed to an estimation of the workload. Therefore the server is used to its best.
4. This model can be configured to act as the three previous models.

TABLE 5

Process Pool Implementation (Connection Oriented Protocol)
Variable number of Agents
NOTE: All configuration variables may be changed dynamically through the Application Manager

| Client Application 1 | Client Application 2 | Server Application | Server Agent 1 | Server Agent 2 |
|---|---|---|---|---|
| | | START OF SERVER<br>Registers itself as "being alive"<br>Starts X Agents (where X is configurable) | Initializes<br>(Sets a timeout to Z minutes) | |
| Initiate Communication | | Becomes Idle<br>(Wait for connections requests)<br>Receives Communication Request<br>Finds an Agent with less than Y connections (where Y is configurable)<br>If no agent is found, create a new one and select it | Becomes Idle | |
| Communication is established with the Server | | Forwards the request to the selected agent | Accepts the Connection | |
| Sends a Request | | Becomes Idle | Receives the request<br>Processes the request | |
| Receives the Response | | | Responds to the request<br>Becomes Idle | |
| Sends a Request | Initiate Communication<br>Communication is established with the Server | Receives Communication Request<br>Finds an Agent with less than Y connections (where Y is | Receives the request | Accepts the Connection |

TABLE 5-continued

Process Pool Implementation (Connection Oriented Protocol)
Variable number of Agents
NOTE: All configuration variables may be changed dynamically through the Application Manager

| Client Application 1 | Client Application 2 | Server Application | Server Agent 1 | Server Agent 2 |
|---|---|---|---|---|
| | Sends a Request | configurable) If no agent is found, create a new one and select it | Processes the request | Initializes (Sets a timeout to Z minutes) |
| Receives the Response | | Forwards the request to the selected agent | Responds to the request | Accepts the Connection |
| | | Becomes Idle | | Receives the request |
| Terminates communication | | | Closes communication | Processes the request |
| | Receives the Response | | Decrements Server counter of 'live' connections | Responds to the request |
| | | | Becomes Idle | Becomes Idle |
| | | | AGENT TIMEOUT | |
| | | | If Agent has been Idle for more than 'Z' minutes, it times-out | |
| | | Server 'catches' that the agent died. | If there no are live connections. Process Terminates | |
| | | As long as there are less and 'X' agents, create a new agent | | |

Advantages with this model:
1. When an Agent is Idle for too long, it will terminate. Thus releasing server resources.
2. There is a variable number of agents. Therefore if there are a large number of clients, more agents will be created.
3. The number of agents becomes a function of the real workload as opposed to an estimation of the workload. Therefore the server is used to its best.
4. This model can be configured to act as the three previous models.

What is claimed is:

1. A process pooling method of operating a client server comprising:
   a) dispatching a request to a pool agent with available resources;
   b) creating a new pool agent if no presently existing pool agent has available resources when a request is received;
   c) said pool agent processing and responding to the request;
   d) said pool agent self-terminating after a configurable time has transpired without requests.

2. The process according to claim 1 further comprising the step of initializing the server.

3. The process according to claim 2 further comprising the step creating a predetermined number of pool agents.

4. The process according to claim 3 further comprising the step of said pool agent becoming idle after responding to the request.

5. A client server system comprising one or more clients adapted to make requests to a pool master, said pool master being adapted to receive requests from said clients and transmit said requests to a pool agent for processing, said pool master being adapted to create additional pool agents as needed, said pool agents terminating their existence when a configurable amount of time has transpired without requests.

6. The client server system of claim 5 where there is more than one pool master.

7. The client server system of claim 5 where there is a master pool master adapted to receive requests from said clients and transmit said requests to one or more pool masters.

8. A multiprocessor computing apparatus comprising one or more computers hosting an application program generating a request, each computer comprising a generating means for submitting requests from the application to a pool master, said pool master being adapted to receive requests from said clients and transmit said requests to a pool agent for processing, said pool master being adapted to create additional pool agents as needed, said pool agents terminating their existence when a configurable amount of time has transpired without requests.

9. The apparatus according to claim 8 wherein there is more than one pool master.

10. The apparatus according to claim 8 wherein there is a master pool master that is adapted to transmit requests to one or more of said pool masters.

11. In a data-processing system including at least one server, a plurality of clients for generating requests, each request specifying an operation to be performed between a client and a server, and at least one connection for providing a communication path between a client and a server, said system comprising a server adapted to create a predetermined number of pool agents; said server adapted to receive a request from a client and send the request to a pool agent with available resources; said server being adapted to create a pool agent if no presently existing pool agent has available resources, said pool agent being adapted to receive the client's request from the server and process it, said pool agent self-terminating a configurable time after processing the request if no additional requests are received by said pool agent.

* * * * *